US012683319B2

(12) United States Patent
Hohenadl et al.

(10) Patent No.: US 12,683,319 B2
(45) Date of Patent: Jul. 14, 2026

(54) HOUSING ASSEMBLY FOR A PLUG CONNECTOR AND METHOD FOR ASSEMBLING A PLUG CONNECTOR

(71) Applicant: Rosenberger Hochfrequenztechnik GmbH & Co. KG, Fridolfing (DE)

(72) Inventors: Florian Hohenadl, Fridolfing (DE); Michael Endlmaier, Fridolfing (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 249 days.

(21) Appl. No.: 18/608,470

(22) Filed: Mar. 18, 2024

(65) Prior Publication Data

US 2024/0347961 A1 Oct. 17, 2024

(30) Foreign Application Priority Data

Mar. 24, 2023 (EP) .................................... 23164088

(51) Int. Cl.
*H01R 13/506* (2006.01)
*H01R 13/52* (2006.01)

(52) U.S. Cl.
CPC ....... *H01R 13/506* (2013.01); *H01R 13/5205* (2013.01)

(58) Field of Classification Search
CPC .......................... H01R 43/005; H01R 13/5205
USPC ................................. 439/625, 710, 475, 712
See application file for complete search history.

(56) References Cited

U.S. PATENT DOCUMENTS

| | | | |
|---|---|---|---|
| 5,586,916 | A | 12/1996 | Shinji |
| 10,847,924 | B2 | 11/2020 | Nguyen |
| 2016/0276771 | A1 | 9/2016 | Theuwis |
| 2022/0149566 | A1 | 5/2022 | Mostoller |

OTHER PUBLICATIONS

European Search Report dated Aug. 24, 2023.

*Primary Examiner* — Christopher M Koehler
*Assistant Examiner* — Gregory L Mangot
(74) *Attorney, Agent, or Firm* — Randall Danskin P.S.

(57) ABSTRACT

A housing assembly (2) for a plug connector (1), having a first housing part (5), to form a cable bushing (7) through which a cable (3) can be introduced into an interior (8) of the housing assembly, and a cable sealing element (12), in the cable bushing (7), for the cable (3). The housing assembly (2) further has a housing securing part (23) enclosing the first housing part (5) in the region of the cable bushing (7) in the region of the cable sealing element (12). The first housing part (5) and the housing securing part (23) are, in a preassembly state, connected in one piece to one another via a connecting web (33).

15 Claims, 7 Drawing Sheets

HOUSING ASSEMBLY FOR A PLUG CONNECTOR AND METHOD FOR ASSEMBLING A PLUG CONNECTOR

CROSS-REFERENCE TO RELATED APPLICATIONS

This U.S. National Stage Non-Provisional Utility Patent Application claims priority to earlier filed European Patent Application No. 23 164 088.9 which was filed on Mar. 24, 2023, The entire contents of the identified earlier filed European Patent Application is expressly and fully incorporated herein by this reference.

Pursuant to USPTO rules, this priority claim to earlier filed European Patent Application No. 23 164 088.9 which was filed on Mar. 24, 2023 is also included in the Application Data Sheet (ADS) filed herewith.

FIELD OF INVENTION

A housing assembly for a plug connector, having at least one first housing part that at least partially circumferentially forms in a cable bushing through which a cable can be introduced into an interior of the housing assembly, and a cable sealing element, that is accommodated in the cable bushing, for the cable.

The invention further relates to a plug connector, in particular an electrical plug connector, having a housing assembly and at least one contact element which can be connected to a cable.

The invention still further relates to a method for assembling a plug connector.

BACKGROUND OF THE INVENTION

Various electrical plug connectors are known from electrical engineering. Electrical plug connectors serve, to transmit electrical power and/or data signals to corresponding mating plug connectors. A plug connector can involve, and without limitation, a plug, a PCB connector, a built-in plug, a bushing, a coupling or an adapter. The designation “plug connector” used in the context of the invention is representative of all variants.

Among other things, increased demands are placed on the impermeability of plug connectors, in particular in relation to the automotive industry and vehicles. Electrical plug connectors with cable sealing elements within a cable bushing of the plug connector housing are fundamentally known. By way of example, reference is made in this regard to U.S. Pat. No. 10,847,924 B2 to. Nguyen, Nhu, et al., titled Contact Device And Contact System, issued on Nov. 24, 2020.

It has been shown that the impermeability of a plug connector equipped with a cable sealing element can be impaired in the case of certain mechanical loads such as, for example, a transverse pull on the cable. As a result of the transverse load which comes from the cable in the region of the cable bushing, the cable sealing element can detach from an inner wall of the plug connector housing and as a result enable the penetration of contaminants or liquids into the plug connector and/or housing.

The production of a plug connector with adequate impermeability which satisfies all the necessary standards and requirements is thus extremely complex. This represents a conflict of objectives with a further key demand on plug connectors, in particular on plug connectors for the automotive industry, according to which it must be possible to produce these cost-effectively in large quantities.

In view of the known prior art, an object of the present invention lies in providing a housing assembly for a plug connector, with which particular high impermeability requirements can be satisfied, with preferably cost-effective production and ease of assembly.

A further object on which the present invention is based is also to provide a plug connector, in particular an electrical plug connector, which satisfies particularly high impermeability requirements, with preferably cost-effective production and ease of assembly.

A further object of the invention is to provide an advantageous method for assembling an electrical plug connector which satisfies high impermeability requirements.

There is provided a housing assembly for a plug connector, having at least one first housing part in order to form a cable bushing (in particular a cable outlet and/or a cable inlet) through which a cable can be introduced into an interior of the housing assembly.

The invention is suitable in particular for use with an electrical plug connector. This should nevertheless not be understood in a restrictive manner since use with an optical plug connector or another plug connector is in principle also possible.

The housing assembly preferably forms the plug connector housing of the plug connector and generally defines at least one interior which is at least substantially enclosed by the housing assembly in its assembled state, and in which plug connector components of the plug connector can be accommodated and optionally fixed and connected to one another.

The at least one housing part can have an at least substantially tubular portion, or sleeve-shaped portion, in order to form the cable busing, with a generally, at least in portions, rectilinear profile along an intended feed or discharge direction for the cable (a curved or angled profile of the cable bushing can, however, also in principle be intended).

The at least one housing part which forms at least a portion of a circumferential part of the cable bushing preferably has, at least in portions, an inner lateral surface which can serve to bear the cable sealing element described herein cited-below. The inner lateral surface can have a substantially planar profile. The inner lateral surface however, may also have recesses and/or elevations, for example, annularly circumferential grooves or ribs, in order to fix the cable and/or the cable sealing element in a form fitting manner in the assembled state of the housing assembly.

It should be mentioned at this point that the cable is preferably not part of the claimed housing assembly. Nevertheless, the assembled cable can optionally also be regarded as part of the housing assembly.

The housing assembly has a cable sealing element for the cable, accommodated in the cable bushing.

The cable sealing element is able to seal off the cable bushing preferably from contaminants, liquids and/or moisture. Gas impermeability can also be provided. In particular, for this purpose, the cable sealing element can provide a seal between cable sheath and inner lateral surface of the housing part which forms the cable bushing.

The cable sealing element is preferably formed in one piece.

In particular, a cable sealing element which is completely closed or annular in the circumferential direction and which defines a central opening for guiding the cable through can be provided. The cable sealing element is preferably fixed inside the cable bushing, for example, in a form-fitting manner, force-fitting manner or by material connection. For example only, and without limitation, the cable sealing element can also be injection-molded in the first housing part, another housing part and/or in the housing securing part described herein.

The cable sealing element can extend along the entire cable bushing, possibly, however, also only be arranged in a portion of the cable bushing. Several cable sealing elements spacedly arrayed arranged along the feed direction for the cable can optionally also be provided.

The invention can also be suitable for use with a housing assembly, or a plug connector, to which several cables are supplied. The cable bushing can be correspondingly configured for this purpose, wherein several cable bushings can also be provided which open into the interior defined by the housing assembly (for example, only, and without limitation, arranged next to one another or parallel, but also starting from various directions or sides of the housing assembly).

The cable bushing can, for example only, and without limitation, be formed to accommodate precisely one cable, precisely two cables, precisely three cables, precisely four cables, precisely five cables, precisely two cables or more cables. Each of the cables can be assigned to a separate cable sealing element (several cable sealing elements which are accommodated in the cable bushing can correspondingly be provided), wherein nevertheless several cables (for example, in each case two, three or all the cables) can also be guided through a joint cable sealing element, wherein the joint cable sealing element preferably has several openings for the respective guiding through of the individual cables.

The invention is described herein substantially on the basis of a housing assembly or a plug connector with only one single cable. This is nevertheless only to serve the purpose of improved understanding and should not be understood in a restrictive manner for the invention.

The housing assembly has a housing securing part which, at least in portions, encloses the housing parts (at least the first housing part and the second housing part) at least in the region of the cable bushing.

It can be provided that the housing securing part is formed in the manner of a terminal cap or end cap for the housing assembly. The housing securing part can enclose the housing part(s) preferably at least starting from the cable-side end of the cable bushing. It can also be provided that the housing securing part is formed to be annular or sleeve-shaped and has no face-side terminal surface or stop surface.

It can in particular be provided that the housing securing part encloses the first housing part (and/or the second housing part also cited below) at least in the region of the cable bushing in which the cable sealing element is arranged.

The housing securing part is able to advantageously increase the rigidity of the housing assembly in the region of the cable bushing. A mechanical load on the cable can be at least substantially absorbed by the housing securing part so that a detachment of the cable sealing element from the inner lateral surface of the housing part which forms the cable bushing can be avoided. It has been shown that the impermeability of the housing assembly can significantly improve by using the housing securing part.

It is provided that at least the first housing part and the housing securing part are, in a preassembly state, connected in one piece to one another via at least one connecting web.

The connecting web preferably only has a very small thickness or has a wall thickness which is smaller than the thinnest wall thickness of the housing parts and/or the housing securing part, for example, is smaller by a factor of 1.5, is smaller by a factor of 2 or is even smaller.

A one-part manufacture of the housing securing part with at least one of the housing parts can reduce the costs for the production of the housing assembly in particular if production is performed as a joint plastic injection-molded part.

In one advantageous development of the invention, the connecting web is formed as a predetermined breaking point in order to separate the first housing part and the housing securing part from one another prior to or during final assembly.

As a result of the breaking of the at least one connecting web or the predetermined breaking point, the individual components of the housing assembly can subsequently be treated as separate parts in a conventional manner during final assembly.

The at least one connecting web can in particular be formed to break as a result of an axial movement of the housing securing part in the direction of the cable bushing.

According to a further development of the invention, the connecting web is formed to be elastically deformable at least in portions, in particular in the manner of a film hinge, in order to enable the assembly of the housing securing part on the first housing part.

It can be provided that a defined relative movement (e.g. a rotational or pivoting movement) between the housing securing part and the at least one housing part is possible despite the connecting web.

In one advantageous further development of the invention, the housing securing part is, in the preassembly state, arranged rotated and/or pivoted with respect to a state assembled on the first housing part.

The housing securing part can also be connected to the housing part via the at least one connecting web in such a manner that it, in the unassembled state or preassembly state, in comparison with a state assembled on the housing part is spaced apart from the cable input along the securing assembly direction (for example, along the feed direction for the cable).

In a further development of the invention, the at least one connecting web is formed in the region of the cable bushing of the first housing part.

Precisely one connecting web can be provided. However, several of the connecting webs can also be provided. In so far as several connecting webs are provided, these several connecting webs can preferably be spacedly arrayed along the circumference of the cable bushing, for example only, and without limitation, distributed at equidistant angle segments. The several connecting webs can nevertheless also be arranged parallel or next to one another, in particular in a joint plane, for example, to enable a bending or pivoting movement.

According to a further development of the invention, the housing assembly may have a second housing part which can be connected to the first housing part by known means, such as but not limited to, mechanically connected.

The housing parts preferably form, in the state in which they are connected together, respective circumferential portions of the cable bushing, wherein the housing securing part at least in portions encloses the first housing part and the second housing part at least in the region of the cable bushing in order to fix housing parts onto one another.

The undesirable detachment of the cable sealing element from an inner wall of the plug connector housing such as in the case of transverse forces acting on the cable is, according to experience, pronounced in particular in the case of a multi-part plug connector housing. In this case, the cable sealing element is often arranged between two housing parts which, as a result of play which is generally always present in practice, have a certain degree of mobility with respect to one another. The invention is therefore particularly advantageously (but not exclusively) suitable for a housing assembly in the case of which the cable bushing is formed by plural housing parts. The housing securing part is thus preferably able to jointly enclose the first housing part and the second housing part in order to fix the plural housing parts onto one another.

The housing securing part can advantageously join the housing parts to one another with as little play as possible in order to reduce the mobility between the housing parts and increase the rigidity of the housing assembly—in particular in the region of the cable bushing and particularly preferably in a portion of the cable bushing in which the cable sealing element is arranged.

In addition to the first housing part and the second housing part, in the context of the invention or the proposed housing assembly, further housing parts can also be provided, for example, a third housing part, a fourth housing part and even more housing parts. In so far as “the housing parts” are discussed below, this indication should be taken to refer at least to the first housing part and the second housing part, possibly, however, also further housing parts even if this is not explicitly indicated.

Multi-part plug connector housings or housing assemblies are regularly used in the case of angled plug connectors. The first housing part and the second housing part can therefore involve housing parts of an angled plug connector. At least one the housing parts can then correspondingly be formed to be angled—this is, however, not absolutely necessary.

The second housing part can, for example, form a housing base body of the plug connector and the first housing part can form a housing cover for the housing base body. Overall, the housing parts can preferably form an inner plug connector housing. The housing securing part, as disclosed herein can then be mounted on this inner plug connector housing (it can therefore also be referred to as an “outer plug connector housing” or “terminal cap”).

Preferably, a first part of a circumferential portion of the cable bushing is formed by the first housing part and a second part of a circumferential portion of the cable bushing is formed by the second housing part. The housing parts, which together form the cable bushing, can optionally overlap at least in portions along/about the circumference of the cable bushing, although each of the housing parts is preferably assigned at least substantially to its own circumferential portion of the cable bushing. The cable busing is preferably at least substantially completely closed in the circumferential direction (for example, apart from any gaps in a transition between the housing parts).

According to a further development of the invention, a housing assembly direction for connecting the first housing part to the second housing part, and a securing assembly direction for assembling the housing securing part on the housing parts differ from one another.

In particular, the housing assembly direction and the securing assembly direction run at an angle between about 45° and 90° to one another, preferably orthogonally or at least substantially orthogonally to one another. In this way, assembly can be carried out particularly easily and gently, wherein the housing securing part can at the same time block unintentional disassembly of the plural housing parts.

It can also be provided that the housing assembly direction, and the securing assembly direction, run parallel or at least substantially parallel to one another, for example, at an angle of less than about 45°. In this case, assembly can be carried out, for example, by temporarily spreading out a clamp-like housing securing part. In this case too, the housing securing part can then block unintentional dismantling of the plural housing parts.

In an advantageous further development of the invention, the housing securing part, on at least one of the housing parts, is displaceable (in particular along a feed direction for the cable or at least substantially along the feed direction for the cable, possibly, however, also along a direction which deviates from the feed direction of the cable).

The housing securing part can preferably be guided on the at least one housing part, in particular until the housing securing part reaches a final assembly position in which it fixes the housing parts. For example, it can be provided that the housing securing part and at least one of the housing parts form a linear guide and/or a mutual linear guide.

The assembly of the housing assembly can be simplified by the guide function and the susceptibility to errors (in particular the risk of damage to a component) can be reduced.

For example, the housing securing part can be guided, such as linearly on an outer lateral surface of at least one of the housing parts, in that the housing securing part completely or partially surrounds or clasps the at least one housing part that forms the cable bushing.

Alternatively or additionally, for example, a rail guide system can also be provided, wherein the housing securing part has one or more elevations (e.g. webs, pins, sliding blocks, etc.) which are guided linearly in one or more corresponding recesses (e.g. grooves or folds) arranged running along the assembly direction for the housing securing part (hereinafter referred to as “securing assembly direction”). A reverse arrangement, in which the housing securing part has the depressions and the housing parts have the elevations, can also be provided (as well as mixed variants).

According to a further development of the invention, the housing securing part fully circumferentially, in particular annularly, encloses at least the first housing part in the region of the cable bushing.

In the case of a circumferentially closed housing securing part, the cable bushing can be mechanically reinforced or stiffened particularly effectively. This variant of the invention can therefore be particularly suitable if very high transverse forces on the cable are to be expected.

In a further development of the invention, however, the housing securing part clasps around at least the first housing part in the region of the cable bushing.

In particular, it can be provided that the housing securing part has, for this purpose, at least one support surface with which it can be supported on a counter-support surface of the at least one housing part forming the cable bushing (i.e. on at least one of the outer lateral surfaces of the housing parts), as well as two side legs, which extend from the support surface along respective sides, which face away from one another, of the at least one housing part. Preferably, at least one of the side legs (particularly preferably both side legs) clasps the at least one housing part on the side facing away from the counter-support surface.

Alternatively or additionally, it can also be provided that at least one of the side legs (particularly preferably both side legs) has an elevation (e.g. a web or a pin) In one or more portions between the counter-support surface and the housing side opposite the counter-support surface, with which a fixation or clamping can take place within a side surface of the housing parts.

Advantageously, the clasping of the at least one housing part by the housing securing part can simultaneously be used as a linear guide, for example, a rail guide system.

In one configuration of the invention, the housing securing part can be captively connected in its assembled state to at least one of the housing parts (preferably to at least the first housing part and the second housing part).

In particular, it can be provided that the housing securing part can be locked, pressed or screwed to the first housing part and/or the second housing part. Locking is particularly preferred because it can be implemented using technically simple means and at the same time can also be easily assembled and disassembled. Accordingly, the housing securing part can have one or more locking elements and the housing parts can have corresponding counter-locking elements. The locking elements or counter-locking elements can be, for example only, and without limitation, elastic or resilient locking arms, locking springs, locking projections (e.g. locking hooks), edges, locking receptacles (e.g. openings or recesses).

Preferably, in each case at least one locking element is arranged on at least two sides of the housing securing part, in particular on opposite sides or sides facing away from one another.

As already mentioned, a screw connection of the housing securing part to one of the housing parts can also be provided. This is particularly advantageous if at least the corresponding housing part is formed to be at least substantially rotationally symmetrical.

It can be provided that the first housing part and the second housing part are fastened to one another in a force-fitting, form-fitting and/or material-locking manner in their interconnected assembled state.

In a particularly preferred configuration of the invention, the first housing part and the second housing part can be locked together.

Locking is particularly preferred because it can be implemented using technically simple means and at the same time can also be easily assembled and disassembled. Accordingly, the first housing part can have one or more locking elements and the second housing part can have corresponding counter-locking elements. The locking elements or counter-locking elements can be, for example only, and without limitation, elastic or resilient locking arms, locking springs, locking projections (e.g. locking hooks), edges, locking receptacles (e.g. openings or recesses).

In one advantageous configuration of the invention, the housing securing part is made of the same material as at least one of the housing parts.

Preferably, all housing parts of the housing assembly, in particular the first housing part and the second housing part, as well as the housing securing part are formed from the same material.

The housing parts (in particular the first housing part and the second housing part) and/or the housing securing part are preferably formed from a plastic, in particular a hard plastic, such as a thermoplastic or thermoset (preferably not an elastomer). However, the components can also be formed from a metal, a ceramic or another material. Combinations of multiple materials (within the same component or within the housing assembly) can also be provided. The housing assembly particularly preferably forms an electrically insulating connector housing. The housing assembly can, for example, however, also form an outer conductor assembly of the plug connector.

In one advantageous configuration of the invention, the housing parts, in their connected state, together form a housing assembly for an angled plug connector.

In particular, at least one of the housing parts can be formed to be angled.

In a further development of the invention, the housing assembly has a housing sealing element which is formed to ensure a seal between the first housing part and at least one further housing part, in particular the second housing part.

The housing sealing element is preferably formed in one piece.

It can be provided that the housing sealing element has a circumferentially closed or annular profile and forms a central opening.

In particular—but not exclusively—in the case of a housing assembly for an angled plug connector, it can be provided that the housing sealing element is formed in an angled manner, so that a first portion of the housing sealing element and the central opening extends in a first plane and a second portion of the housing sealing element and the central opening extends in a second plane.

The first plane and the second plane are preferably arranged at an angle between about 45° and 90° relative to one another, in particular aligned orthogonally or at least substantially orthogonally to one another. In principle, however, any angle can be provided between the first plane and the second plane.

The first portion of the housing sealing element preferably corresponds to a U-shaped or partially annular portion of the housing sealing element. The second portion of the housing sealing element preferably corresponds to a further U-shaped portion or annular portion of the housing sealing element.

A transition region can preferably be provided between the first portion and the second portion of the housing sealing element, in particular a transition region with a curved profile, in order to enable a material-friendly transition between the different orientations of the portions.

The first portion is preferably longer than the second portion, wherein the second portion of the housing sealing element is preferably arranged in the region of the cable bushing.

In one advantageous configuration of the invention, the housing sealing element is connected to one of the housing parts in a materially bonded manner.

The housing sealing element can, for example, be glued into one of the housing parts, in particular injection-molded in one of the housing parts. In this way, a captive delivery state can be ensured.

However, it can also be provided that the housing sealing element is connected to at least one of the housing parts in a force-fitting or form-fitting manner. In principle, a captive connection to one of the housing parts is not absolutely necessary when the housing assembly is unassembled—it may therefore be sufficient if the housing sealing element is only fixed by final assembly for the purpose of sealing between the housing parts.

The housing sealing element and/or the cable sealing element can have one or more, for example, two, three, four or even more sealing lips.

In one configuration of the invention, the cable sealing element and the housing sealing element are formed in one piece by a common sealing body.

In particular, it can be provided that the cable sealing element and the housing sealing element form respective portions of the common seal body. The production of a common sealing body can reduce manufacturing costs and also make assembly easier and more reliable.

The invention also relates to a plug connector, in particular an electrical plug connector, having a housing assembly and at least one contact element that can be connected to the cable (e.g. an inner conductor contact element or an outer conductor contact element).

By using the housing securing part, which can serve as an outer housing for at least the first housing part, at least in the region of the cable bushing of the plug connector, the mechanical properties of the housing assembly can be enhanced. In particular, the rigidity and transverse tensile strength in the region of the cable bushing can be increased because the wall thickness of the first housing part is increased and the first housing part can be fixed to the second housing part (if present). In the proposed manner, a particularly robust, waterproof plug connector, in particular a waterproof angled plug connector, can be provided.

The plug connector can have any desired plug connector components. For example, the plug connector can have various contact elements, a mechanical plug-in interface for connection to a mating plug connector, dielectrics, shielding means and other sealing elements.

As already mentioned, the plug connector can be an electrical plug connector (e.g. a shielded electrical plug connector or a coaxial plug connector or a differential plug connector), an optical plug connector or another plug connector. The invention is not to be understood as being limited to a specific variant.

The plug connector can be used particularly advantageously within a vehicle, in particular a motor vehicle. Possible areas of application include autonomous driving, driver assistance systems, navigation systems, infotainment systems, rear-seat entertainment systems, Internet connections and wireless gigabit (IEEE 802.1 lad standard). Possible applications include high-resolution cameras, such as 4K and 8K cameras, sensors, onboard computers, high-resolution screens, high-resolution dashboards, 3D navigation devices and mobile devices. It can also be used as a high-voltage connector. However, the plug connector according to the invention is suitable for any application within the entire electrical engineering sector and is not limited to use in vehicle technology.

The invention also relates to a method for assembling a plug connector, comprising at least the following method steps: (1) Providing a housing assembly which has at least one first housing part and a housing securing part which, in a preassembly state, are connected in one piece to one another via at least one connecting web; (2) Introducing a cable through a cable sealing element which is accommodated in a cable bushing formed by at least the first housing part; and (3) Final assembly of the housing securing part on at least the first housing part so that it Is enclosed at least in portions at least in the region of the cable bushing by the housing securing part, and (4) the at least one connecting web is broken during or prior to final assembly in order to separate the first housing part and the housing securing part.

It should be emphasized at this point that the method steps mentioned do not necessarily have to be carried out in the order in which they are first described or mentioned. For example, individual method steps or groups of method steps can be interchangeable with one another if this is not technically impossible. Method steps can also be combined with one another, divided into separate Intermediate steps or supplemented with intermediate steps. The method is also not necessarily described conclusively with the method steps described and can be supplemented with further method steps that are not mentioned.

It can preferably be provided that the cable sealing element and/or the housing securing part are already pushed onto the cable before the cable is inserted into the cable bushing.

Features that have been described in connection with one of the subject matters of the invention, namely given by the housing assembly, the plug connector and the method, can also be advantageously implemented for the other subject matters of the invention. Likewise, advantages that were mentioned in connection with one of the subject matters of the invention can also be understood in relation to the other subject matters of the invention.

In addition, it should be noted that terms such as "comprising", "having" or "with" do not exclude any other features or steps. Furthermore, terms such as "a" or "the", which refer to a singular number of steps or features, do not exclude a plurality of features or steps—and vice versa.

Terms such as "first" or "second" etc. are used primarily for reasons of distinguishing between respective device or method features and are not necessarily intended to indicate that features are mutually dependent or related to one another.

Values and parameters described herein include deviations or fluctuations of ±10% or less, preferably ±5% or less, more preferably ±1% or less, and very particularly preferably ±0.1% or less of the respectively named value or parameter, provided that these deviations are not excluded when Implementing the invention in practice. The specification of ranges using start and end values also encompasses all those values and fractions that are included in the respectively known range, in particular the start and end values and a respective mean value.

The invention furthermore also relates to a housing sealing element for a housing assembly of a plug connector The independent housing sealing element has a circumferentially completely closed profile and forms a central opening. The independent housing sealing element is characterized in that it is formed to be angled so that a first portion of the housing sealing element and the central opening extends in a first plane and a second portion of the housing sealing element and the central opening extends in a second plane. The features mentioned herein, in particular those that relate to the housing sealing element of the housing assembly, relate to advantageous embodiments and variants of the independent housing sealing element. The features of the first housing part and/or the second housing part described herein are to be understood as advantageous embodiments and variants of the independent housing part.

Exemplary embodiments of the invention are described in greater detail herein with reference to the Drawings/Figures.

The drawings show in each case preferred exemplary embodiments in which individual features of the present invention are represented in combination with one another. Features of an exemplary embodiment can also be implemented independently of the other features of the same exemplary embodiment and can correspondingly be readily combined by a person skilled in the art to form further expedient combinations and sub-combinations with features of other exemplary embodiments.

SUMMARY

Our invention generally provides a housing for a plug connector and a method for assembling a plug connector.

A principal aspect of the present invention is a housing assembly (2) for a plug connector (1), having at least one first housing part (5) in order to form a cable bushing (7) through which a cable (3) can be introduced into an interior (8) of the housing assembly (2); a cable sealing element (12), accommodated in the cable bushing (7), for the cable (3); and a housing securing part (23) which at least in portions encloses at least the first housing part (5) at least in the region of the cable bushing (7), preferably at least in the region of the cable sealing element (12), characterized in that at least the first housing part (5) and the housing securing part (23) are, in a preassembly state, connected in one piece to one another via at least one connecting web (33).

A further aspect of the present invention is a housing assembly (2) characterized in that the connecting web (33) is formed as a predetermined breaking point in order to separate the first housing part (5) and the housing securing part (23) prior to or during final assembly.

A further aspect of the present invention is a housing assembly (2) characterized in that the connecting web (33) is formed to be elastically deformable at least in portions, in particular in the manner of a film hinge, in order to enable the assembly of the housing securing part (23) on the first housing part (5).

A further aspect of the present invention is a housing assembly (2) characterized in that the at least one connecting web (33) is formed in the region of the cable bushing (7) of the first housing part (5).

A further aspect of the present invention is a housing assembly (2) characterized in that several of the connecting webs (33) are arranged distributed along the circumference of the cable bushing (7).

A further aspect of the present invention is a housing assembly (2) characterized in that precisely one connecting web (33) is provided.

A further aspect of the present invention is a housing assembly (2) characterized in that the housing securing part (23) is, in the preassembly state, arranged rotated and/or pivoted with respect to a state assembled on the first housing part (5).

A further aspect of the present invention is a housing assembly (2) characterized in that the housing securing part (23) is, in the preassembly state, spaced apart from the cable bushing (7) in comparison with a state assembled on the first housing part (5) along a feed direction (Z) for the cable (3).

A further aspect of the present invention is a housing assembly (2) characterized by a second housing part (6) which can be connected mechanically to the first housing part (5), wherein the housing parts (5, 6), in their state connected to one another, form respective circumferential portions ($U_1$, $U_2$) of the cable bushing (7), wherein the housing securing part (23) at least in portions encloses the first housing part (5) and the second housing part (6) at least in the region of the cable bushing (7) in order to fix the housing parts (5, 6) on one another.

A further aspect of the present invention is a housing assembly (2) characterized in that a housing assembly direction (G) for connecting the fit housing part (5) to the second housing part (6) and a securing assembly direction (S) for assembling the housing securing part (23) on the housing parts (5, 6) differ from one another, preferably run orthogonally to one another.

A further aspect of the present invention is a housing assembly (2) characterized in that the housing securing part (23) on the first housing part (5) is displaceable along a feed direction (Z) for the cable (3) into a final assembly position in which the housing securing part (23) at least in portions encloses the first housing part (5) at least in the region of the cable bushing (7), wherein the housing securing part (23) and the first housing part (5) preferably form a mutual linear guide.

A further aspect of the present invention is a housing assembly (2) characterized in that the housing securing part (23) clutches or fully circumferentially encloses at least the first housing part (5), preferably at least the first housing part (5) and the second housing part (6), in the region of the cable bushing (7).

A further aspect of the present invention is a housing assembly (2) characterized by a housing sealing element (15) which is formed to ensure a seal between the first housing part (5) and at least one further housing part, in particular the second housing part (6), wherein the housing sealing element (15) has a circumferentially closed profile and forms a central opening (19), and wherein the housing sealing element (15) is formed at an angle so that a first portion (20) of the housing sealing element (15) and the central opening (19) extends in a first plane ($E_1$) and a second portion (21) of the housing sealing element (15) and the central opening (19) extends in a second plane ($E_2$).

A still further aspect of the present invention is a plug connector (1), in particular electrical plug connector, having a housing assembly (2) and at least one contact element (4) which can be connected to the cable (3).

An even still further aspect of the present invention is a method for assembling a plug connector (1), comprising the following method steps: providing a housing assembly (2) which has at least one first housing part (5) and a housing securing part (23) which, in a preassembly state, are connected in one piece to one another via at least one connecting web (33); introducing a cable (3) through a cable sealing element (12) which is accommodated in a cable bushing (7) formed by at least the first housing part (5); and final assembly of the housing securing part (23) on at least the first housing part (5) so that it is enclosed at least in portions at least in the region of the cable bushing (7) by the housing securing part (23), and wherein the at least one connecting web (33) is broken during or prior to final assembly in order to separate the first housing part (5) and the housing securing part (23).

These and other aspects of the present invention are more fully set forth and disclosed herein.

BRIEF DESCRIPTIONS OF THE DRAWINGS

Functionally identical elements are provided with the same reference signs in the figures.

DETAILED WRITTEN DESCRIPTION OF THE PREFERRED EMBODIMENTS

This disclosure of the invention is submitted in furtherance of the Constitutional purposes of the US Patent Laws "to promote the progress of Science and the useful arts" (Article 1, Section 8).

In FIGS. 1 to 5, a plug connector 1 (for example, an electrical plug connector) with a housing assembly 2 and a cable 3 (for example, an electrical cable) passing into an opening into the housing assembly 2 is shown by way of example in several assembly steps of the housing assembly 2. The exemplary embodiments each show an angled plug connector 1, which, however, is not to be understood as restricting the invention. In principle, the invention is also suitable for use with non-angled plug connectors.

The plug connector 1 represented by way of example in FIGS. 1 to 5 can have various known plug connector components. By way of example, a contact element 4 is indicated in the figures (e.g. an outer conductor contact element or an inner conductor contact element).

Figure 1:
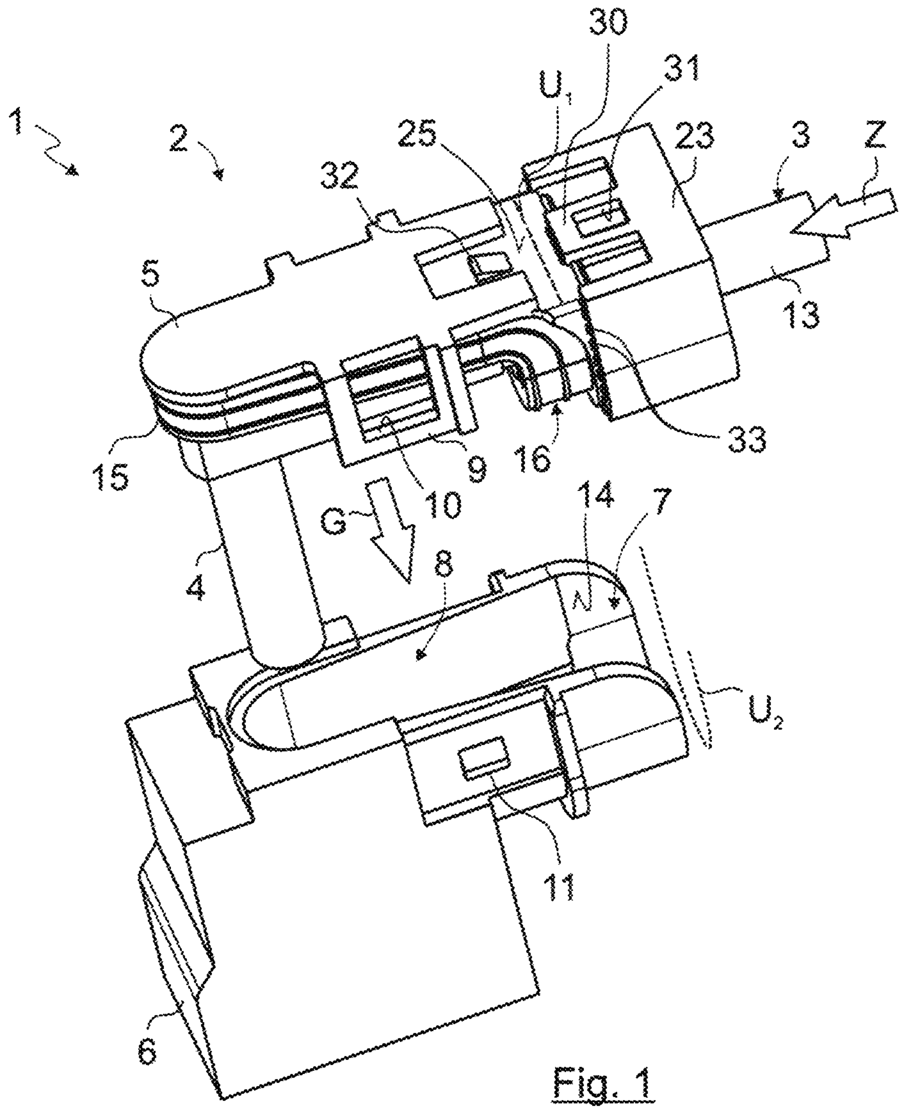
FIG. 1 shows a perspective view of a plug connector with a housing assembly according to one exemplary embodiment of the, during a first assembly step.
Figure 2:
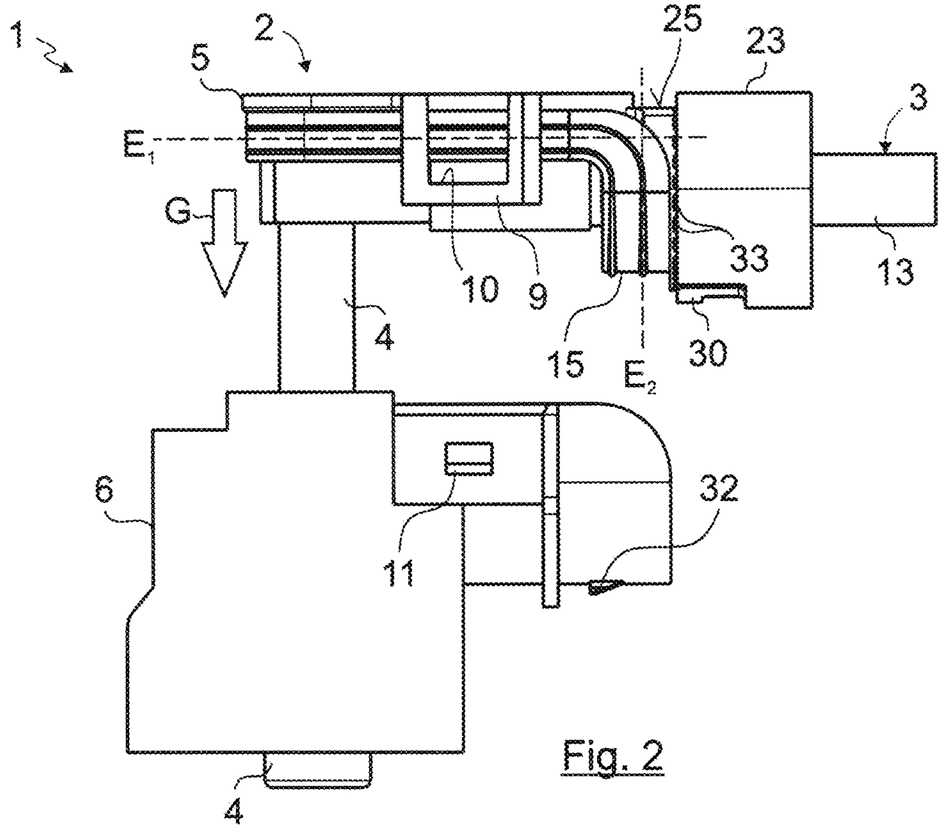
FIG. 2 shows a side view of the plug connector of FIG. 1, during the first assembly step.
Figure 3:
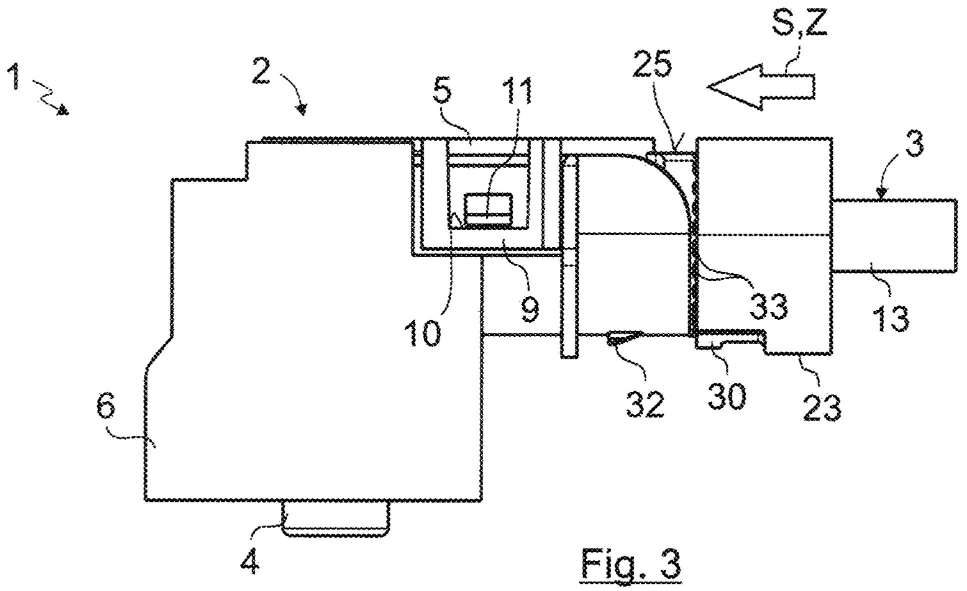
FIG. 3 shows a side view of the plug connector of Figure, during a second assembly step.
Figure 4:
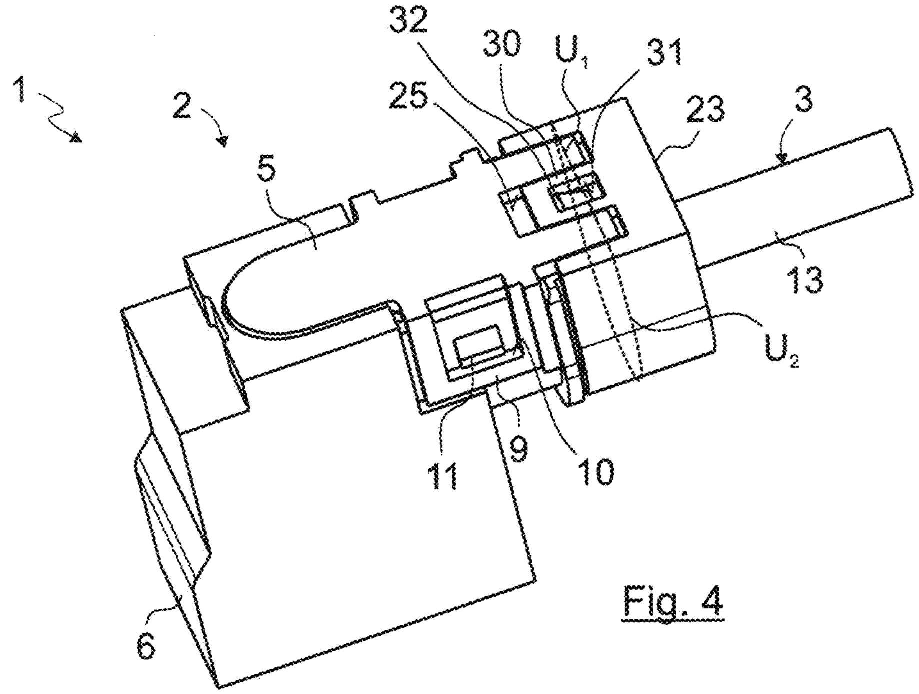
FIG. 4 shows a perspective view of the plug connector of FIG. 1, in a fully assembled state of the housing assembly.
Figure 5:
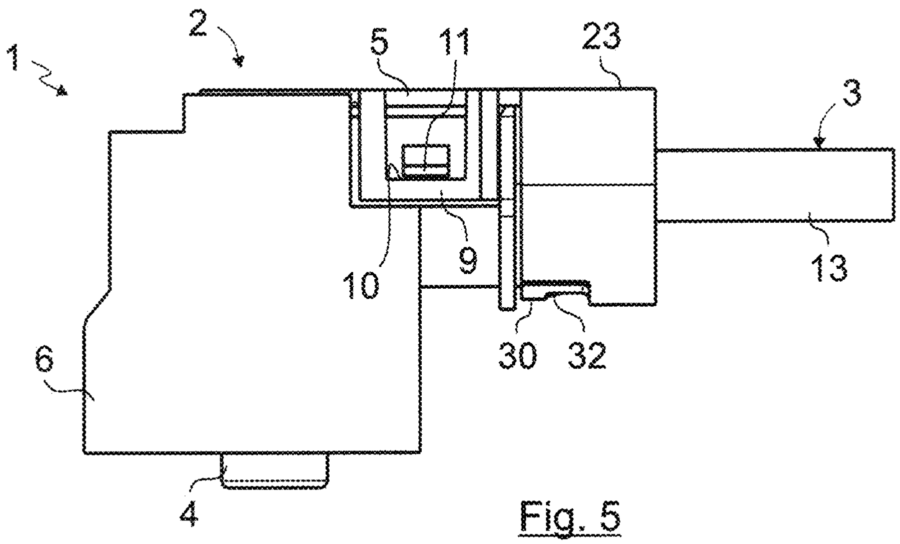
FIG. 5 shows a side view of the plug connector of FIG. 1, in the fully assembled state of the housing assembly.

The housing assembly 2 has at least a first housing part 5. In principle, this can already be sufficient within the scope of the invention, which will be clarified herein using the exemplary embodiment of FIGS. 15 to 17. In the exemplary embodiments of FIGS. 1 to 14, however, the housing assembly 2 also has a second housing part 6. The first housing part 5 and the second housing part 6 can be connected to one another by known means, such as but not limited to mechanically, as indicated in FIGS. 1 and 2. In FIGS. 3 to 5, the housing parts 5, 6 are already connected to one another, and in their connected state they together form a cable bushing 7 through which the cable 3 can be introduced into an interior 8 (cf. FIG. 1) defined by the housing assembly 2 or defined by the plug connector 1. The housing parts 5, 6 may each form respective circumferential portions $U_1$, $U_2$ (cf. FIGS. 1 and 8) of the cable bushing 7 for this purpose.

The two housing parts 5, 6 can be locked together. For this purpose, the first housing part 5 has at least one, at least in portions, spring-elastic locking arm 9 with a locking receptacle 10, which can be gripped behind by a corresponding locking hook 11 of the second housing part 6 (cf., for example, the assembled state in FIG. 3). In principle, the connection between the first housing part 5 and the second housing part 6 can, however, also be fixed in another way, for example only, and without limitation, by a screw connection, a frictional connection or even by a material connection.

A cable sealing element 12 (cf. FIGS. 6 to 10) for the cable 3 is accommodated in the cable bushing 7 formed by the two housing parts 5, 6 in order to form a seal between a cable sheath 13 and the inner lateral surface 14 of the housing parts 5, 6 that form the cable bushing 7 (cf. FIG. 1).

Figure 6:
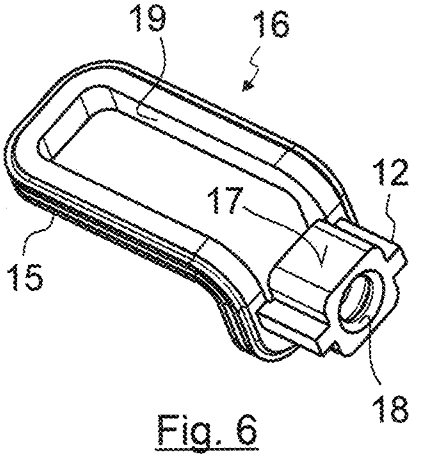
FIG. 6 shows a perspective view of a one-piece sealing body with a housing sealing element and a cable sealing element according to one exemplary embodiment.
Figure 7:
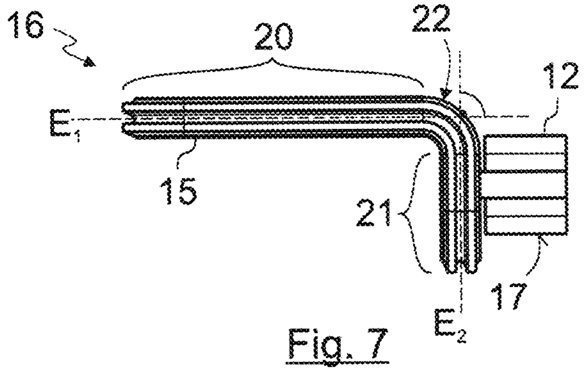
FIG. 7 shows a side view of the sealing body of FIG. 6.

In the exemplary embodiments, the cable sealing element 12 is, by way of example, formed in one piece together with a housing sealing element 15 by a common sealing body 16, which is shown in an individual representation in FIGS. 6 and 7 in a variant that is to be understood as only an example. In principle, a multi-part configuration and therefore a separate cable sealing element 12 is also possible and also contemplated.

The cable sealing element 12 is primarily formed to be tubular or sleeve-shaped, wherein the outer lateral surface 17 of the cable sealing element 12 preferably extends over the entire surface along the inner lateral surface 14 of the housing parts 5, 6 in the region of the cable bushing 7 when the housing assembly 2 is fully assembled. The cable sealing element 12 is formed to be completely closed or annular in the circumferential direction and defines a central opening 18 (cf. FIG. 6) for the cable 3 to pass through.

The housing sealing element 15 is formed to ensure a seal between the housing parts 5, 6 and also forms a circumferentially closed profile with a further central opening 19 (cf. FIG. 6). The housing sealing element 15 is—like the housing parts 5, 6—formed to be angled, so that a first portion 20 of the housing sealing element 15 (a "U-shaped" portion) or a first portion 20 of the central opening 19 extends in a first plane Et and a second portion 21 (again "U-shaped" portion) of the housing sealing element 15 or a second portion 21 of the central opening 19 extends in a second plane $E_2$, as indicated in FIG. 7. The planes $E_1$, $E_2$ are preferably arranged orthogonally to one another, as can be seen, for example, on the basis of FIGS. 2 and 7. A transition portion 22 can be provided between the respective first and second portions 20, 21 in order to enable a uniform and gentle, for example rounded, transition between the respective first and second portions 20, 21.

The common sealing body 16 or the housing sealing element 15 and/or the cable sealing element 12 can be fixed in at least one of the housing parts 5, 6, in particular connected in a materially bonded manner to one of the housing parts 5, 6. For example, the common sealing body 16 or the housing sealing element 15 can already be injection-molded in the first housing part 5 during production. In this way, manufacturing costs can be reduced and the assembly process can be simplified.

The housing assembly 2 furthermore has a housing securing part 23 which at least in portions encloses the housing parts 5, 6 at least in the region of the cable bushing 7 and in particular in the region of the cable sealing element 12 in order to fix the housing parts 5, 6 to one another.

The housing securing part 23 can be displaceable at least on one of the housing parts 5, 6 into a final assembly position (cf. FIGS. 4 and 5). This displacement preferably takes place along a feed direction Z for the cable (cf. FIGS. 1 and 3), but can also deviate from the feed direction Z of the cable 3 if necessary. In the final assembly position, the housing securing part 23 fixes the housing parts 5, 6 together and thus increases the mechanical stability of the housing assembly 2 against transverse loads in the region of the cable bushing 7, so that impermeability is maintained even under adverse conditions of use.

Housing assembly direction G (cf. FIG. 2) for connecting the first housing part 5 to the second housing part 6 and securing assembly direction S (cf. FIG. 3) for assembling the housing securing part 23 on the housing parts 5, 6 preferably differ from one another. Particularly preferably, the housing assembly direction G and the securing assembly direction S run orthogonally to one another. However, this is not absolutely necessary—the securing assembly direction S can also possibly run in the same direction as the housing assembly direction G—in particular if the housing securing part 23 is not completely closed in the circumferential direction.

For the displacement of the housing securing part 23 on the at least one housing part 5, 6, a guide, in particular a linear guide, can be provided, particularly in the region of the housing parts 5, 6 in which the cable bushing 7 is formed. In particular, the guiding functions for the assembly of the housing securing part 23 and the fixing function of the housing securing part 23 can complement each other.

Figure 8:
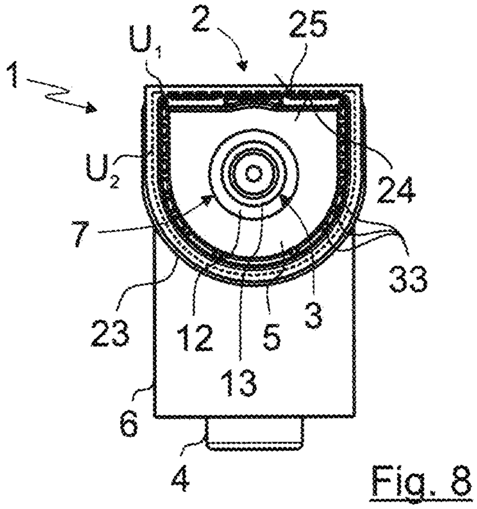
FIG. 8 shows a front view of the cable bushing of a fully assembled housing assembly according to a first variant, wherein the housing securing part fully circumferentially encloses the cable bushing.
Figure 9:
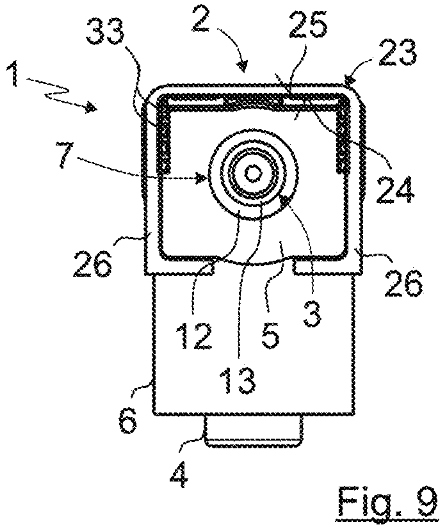
FIG. 9 shows a front view of the cable bushing of a fully assembled housing assembly according to a second variant, wherein the housing securing part clutches the cable bushing.
Figure 10:
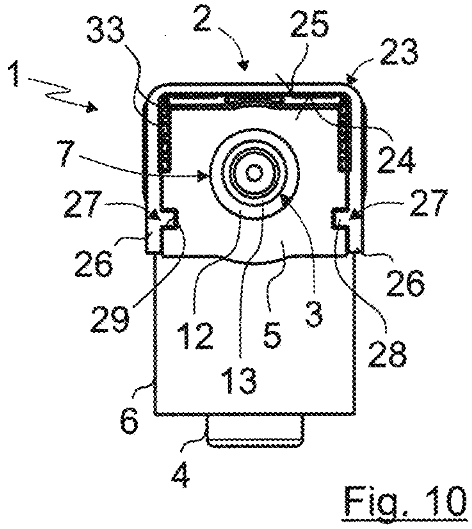
FIG. 10 shows a front view of the cable bushing of a fully assembled housing assembly according to a third variant, wherein the housing securing part is in engagement with the cable bushing via a rail guide system.

FIGS. 8 to 10 represent three exemplary variants of housing securing parts 23 based on a front view of the cable bushing 7 in an assembled state.

A particularly robust stabilization of the cable bushing 7 can be achieved, for example, if the housing securing part 23 fully circumferentially encloses the housing parts 5, 6 in the region of the cable bushing 7, as indicated in FIG. 8. Due to the corresponding interaction of the inner lateral surface of the housing securing part 23 and the outer lateral surface of the housing parts 5, 6 (particularly in the region of the cable bushing 7), a linear guide can thus also be provided.

The situation is similar with the housing securing part 23 according to FIG. 9, which only clasps the housing parts 5, 6 in the region of the cable bushing 7. For this purpose, a support surface 24 of the housing securing part 23 rests on a counter-support surface 25 of the housing parts 5, 6 forming the cable bushing 7. Starting from the support surface 24 of the housing securing part 23, two opposite side legs 26 extend, which clasp the second housing part 6 with their end portions. In turn, a linear guide can be formed at the same time as a result.

Another type of clasping with an integrated linear guide is indicated in FIG. 10. Rail guide systems 27 on both sides are formed. Correspondingly, the side legs 26 have elongated webs 28 which run in the securing assembly direction S and which are guided in corresponding grooves 29 defined in the housing parts 5, 6.

In its assembled state, the housing securing part 23 can be captively connected to at least one of the housing parts 5, 6. In the exemplary embodiments, the housing securing part 23 can be locked with the first housing part 5 and with the second housing part 6. For this purpose, the housing securing part 23 has an at least partially elastic locking arm 30 with a locking receptacle 31 (cf. FIG. 1), which can be gripped behind by a locking hook 32 of the respective housing part 5, 6 (cf. FIGS. 1 and 2). In principle, fixation between the housing securing part 23 and at least one of the housing parts 5, 6 can take place in any desired way, for example, also by pressing or screwing (not shown).

In the context of a method for assembling the electrical connector 1, it can, for example, first be provided that the cable 3 is passed through the housing securing part 23 and the cable sealing element 12 (=preassembly of the housing securing part 23 and the cable sealing element 12 on the cable 3). The housing securing part 23 can then be assembled so that at least the first housing part 5 is at least partially enclosed at least in the region of the cable bushing 7. In so far as two (or even more) housing parts 5, 6 are provided, these can optionally be connected or assembled to one another before the housing securing part 23 is assembled, so that the housing parts 5, 6 each form respective circumferential portions $U_1$, $U_2$ of the common cable bushing 7 through which the cable 3 is guided into the interior 8 defined in the plug connector 1.

In order to further improve the production of the housing assembly 2 and the assembly of the housing assembly 2, it can optionally be provided that at least one of the housing parts 5, 6 (in the exemplary embodiments, in each case the first housing part 5) and the housing securing part 23 are, in a pre-assembly state or in a unassembled state, connected to one another in one piece via at least one connecting web 33. The principle should first be explained in greater detail on the basis of the exemplary embodiment of FIGS. 11 to 14.

FIGS. 11 to 14 show a fundamentally similar exemplary embodiment of the invention, as already explained on the basis of FIGS. 1 to 10, which is why functionally identical elements are not described again in detail. The cable 3 and the cable sealing element 12 or the common sealing body 16 are hidden in FIGS. 11 to 14. Again, the housing assembly 2 has a first housing part 5 and a second housing part 6, which in the assembled state together form a cable bushing 7 in which a cable sealing element 12 for the cable 3 is accommodated.

For the one-piece connection between the first housing part 5 and the housing securing part 23, a connecting web 33 is provided, which may be formed in the manner of a film hinge. For this purpose, the connecting web 33 has, at least in portions, a very thin wall thickness and is therefore sufficiently elastic to enable a pivoting movement between the housing securing part 23 and the first housing part 5. The end position of the housing securing part 23 on the first housing part 5 can possibly already be reached by this pivoting movement. If necessary, it can, however, also be provided that the connecting web 33 breaks off in a defined manner during the pivoting movement and/or during a subsequent axial movement. The connecting web 33 can therefore also be formed as a predetermined breaking point.

Through this connecting web 33, the first housing part 5 and the housing securing part 23 can be produced together during assembly, in particular by a common plastic injection molding process, wherein the first housing part 5 and the housing securing part 23, before or during final assembly, can be separated by breaking the predetermined breaking point or can be assembled together by a movement guided over the connecting web 33. The housing securing part 23 and the housing parts 5, 6 are therefore preferably formed from the same material, in particular a plastic.

Figure 11:
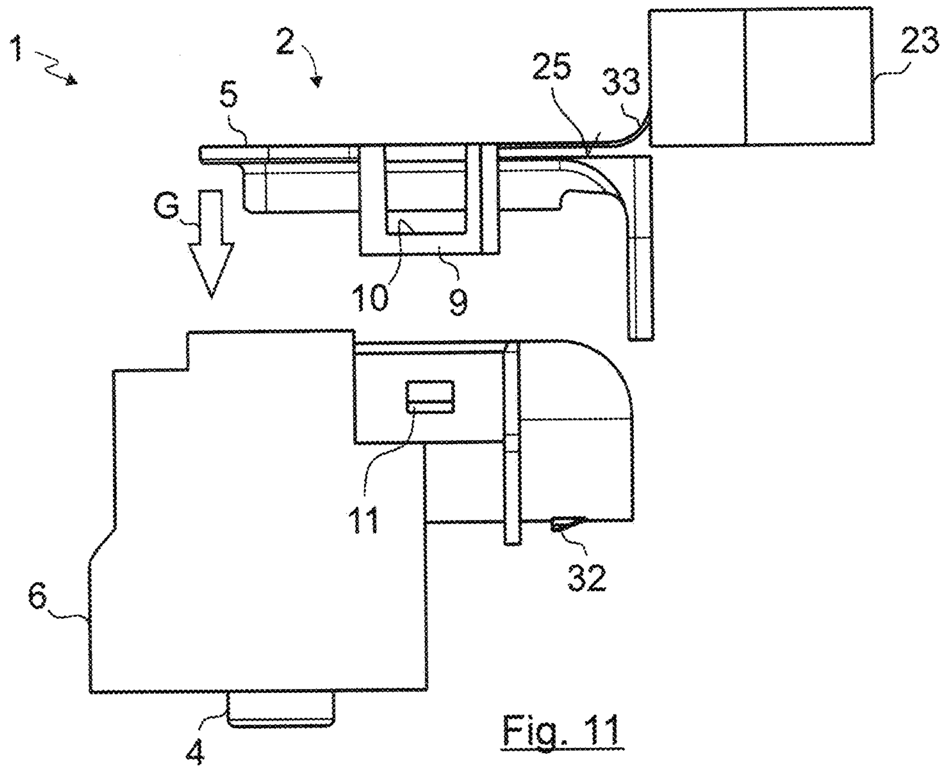
FIG. 11 shows a side view of a plug connector with a housing assembly according to a further exemplary embodiment of the invention, during a first assembly step.
Figure 12:
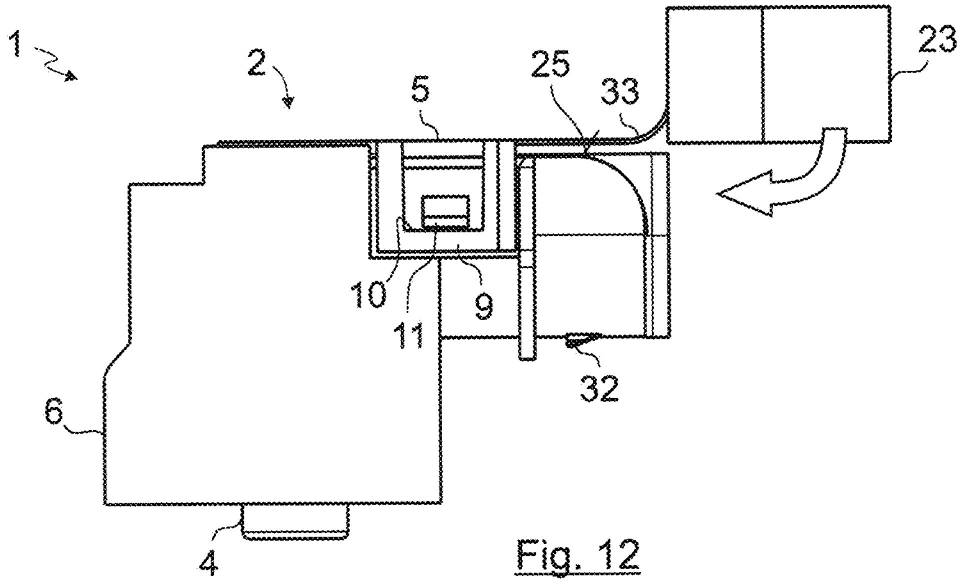
FIG. 12 shows a side view of the plug connector of FIG. 11, during a second assembly step.
Figure 13:
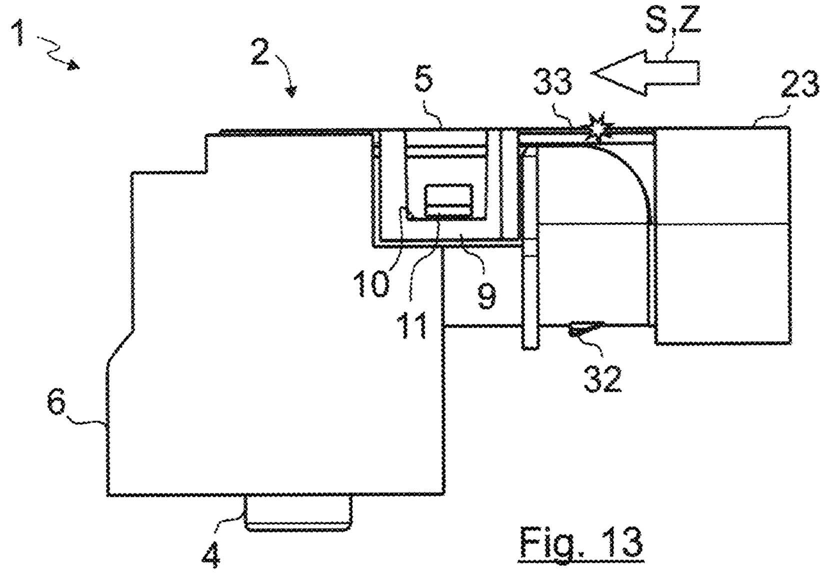
FIG. 13 shows a side view of the plug connector of FIG. 11, during a third assembly step.
Figure 14:
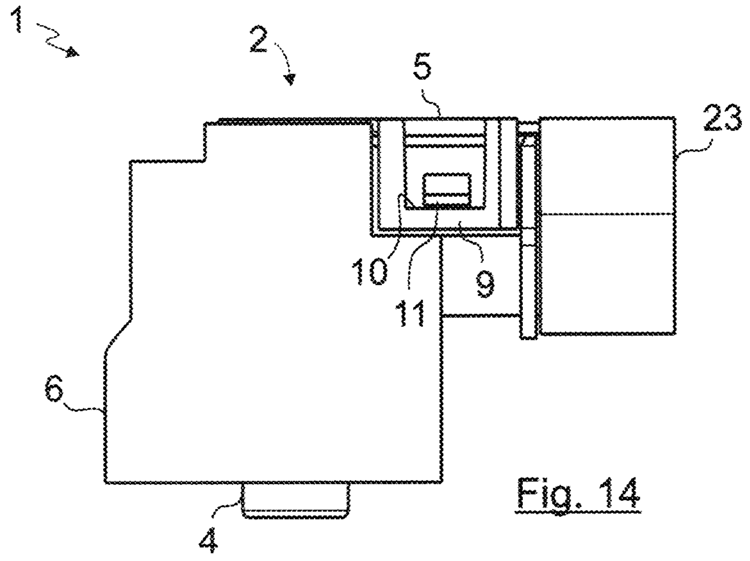
FIG. 14 shows a side view of the plug connector of FIG. 11, in a fully assembled state of the housing assembly.

After assembly of the two housing parts 5, 6 (cf. FIGS. 11 and 12), it can therefore be provided, for example, that the housing securing part 23, which in the exemplary embodiment of FIGS. 11 and 14 in the pre-assembled state is retained via the connecting web 33 is rotated or pivoted axially (along the feed direction Z for the cable 3) in comparison with the final assembly position, is first pivoted (cf. FIGS. 12 and 13) and then displaced along the securing assembly direction S to the final assembly position (cf. FIGS. 13 and 14). The connecting web 33 can optionally be formed to break at any time during the assembly process, in particular during the axial displacement along the securing assembly direction S (indicated in FIG. 13).

In the exemplary embodiment of FIGS. 11 to 13, exactly one connecting web 33 is provided for connecting the housing securing part 23 to the first housing part 5. In principle, however, several connecting webs 33 can also be provided, for example, several connecting webs 33, which are distributed circumferentially about the circumference of the cable bushing 7 and, for example, equidistantly, as indicated in FIGS. 1 to 5 and in particular in FIGS. 8 to 10. When using several connecting webs 33 distributed along the circumference of the cable bushing 7, it can preferably be provided that the housing securing part 23 is only offset axially about the feed direction Z or securing assembly direction S compared to the final assembly state, but is not twisted or pivoted.

As already mentioned, within the scope of the invention, it is not absolutely necessary that the connecting web 33 breaks off during assembly, in principle, the connecting web 33 can also be formed to be sufficiently elastic or deformable in order to enable the housing securing part 23 to move into the final assembly position without breaking off. However, this is less preferred.

It is advantageous within the scope of the invention, but not absolutely necessary, for the housing assembly 2 to have plural housing parts 5, 6. In principle, the first housing part 5 can already be sufficient, the outer wall of which can then be mechanically reinforced by means of the housing securing part 23. A corresponding exemplary embodiment, in which the plug connector 1 or the housing assembly 2 only has a single housing part 5, is shown by way of example in FIGS. 15 to 17. The cable 3 and the cable sealing element 12 or the sealing body 16 are not shown in FIGS. 15 to 17 solely to simplify the illustration.

Figure 15:
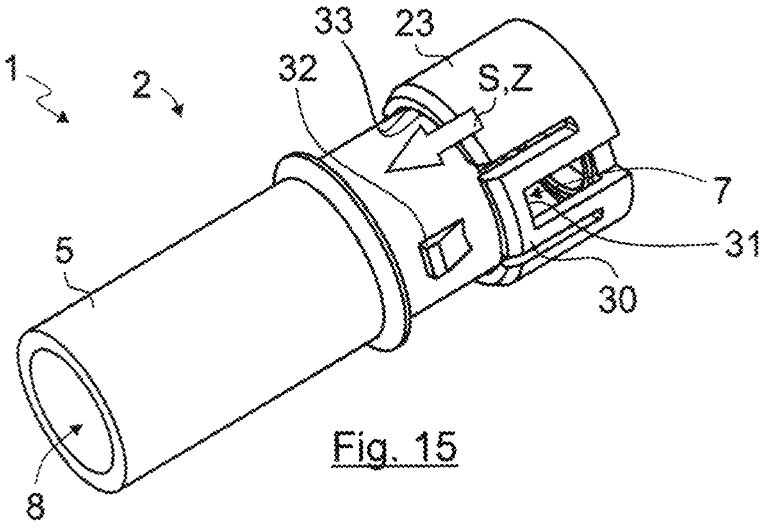
FIG. 15 shows a perspective view of a plug connector with a housing assembly according to a further exemplary embodiment of the invention, during assembly.
Figure 16:
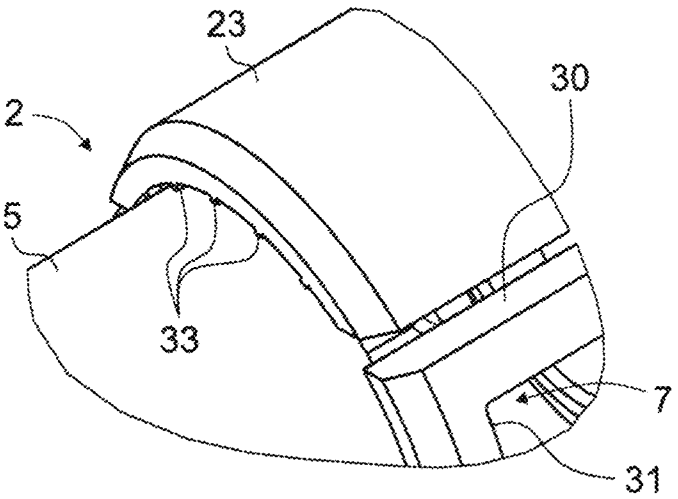
FIG. 16 shows a cut-out enlargement of FIG. 15.
Figure 17:
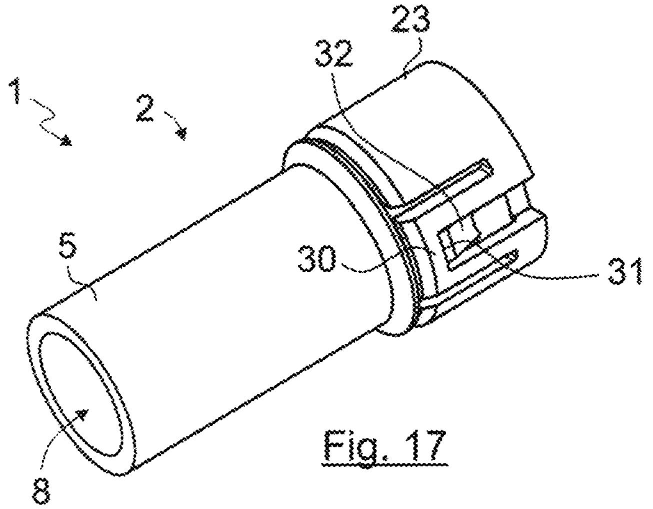
FIG. 17 shows a perspective view of the plug connector of FIG. 15, in the assembled state.

FIGS. 15 to 17 each show a cut-out of a coaxial plug connector 1, wherein the specific geometric design and the plug type are not important within the scope of the invention. The exemplary, round plug connector 1 has the first housing part 5, along the outer sheath of which the housing securing part 23 can be displaced linearly along the feed direction Z for the cable 3, not represented.

As can be seen in particular on the basis of the cut-out enlargement of FIG. 16, the first housing part 5 and the housing securing part 23 are connected to one another in one piece in the preassembly state shown in FIGS. 15 and 16 via several connecting webs 33 arranged distributed about the circumference (a single connecting web 33 may, however, already be sufficient, as mentioned above). These several connecting webs 33 are formed as predetermined breaking points and break off in a defined manner due to the axial displacement of the housing securing part 23 in the direction of the final assembly position. In the final assembly position shown in FIG. 16, the first housing part 5 and the housing securing part 23 are locked together (cf. locking arm 30 or locking receptacle 31 of the housing securing part 23 and locking hook 32 of the first housing part 5).

A principal object of the present invention is a housing assembly (2) for a plug connector (1), the housing assembly (2) comprising: a first housing part (5), that forms at least a circumferential portion of a cable bushing (7) through which a cable (3) can be introduced into an interior (8) defined by the housing assembly (2); and a cable sealing element (12), for the cable (3) in the cable bushing (7); and a housing securing part (23) which, at least in portions, encloses the first housing part (5) proximate the cable bushing (7), in a region of the cable sealing element (12); and a connecting web (33), that connects the first housing part (5) and the housing securing part (23) to one another in a pre-assembly state.

A further object of the present invention is a housing assembly (2) wherein the connecting web (33) is a predetermined breaking point to separate the first housing part (5) and the housing securing part (23) from one another.

A further object of the present invention is a housing assembly (2) wherein the connecting web (33) is elastically deformable at least in portions, to enable assembly of the housing securing part (23) on the first housing part (5).

A further object of the present invention is a housing assembly (2) wherein, the connecting web (33) proximate the cable bushing (7) formed by the first housing part (5).

A further object of the present invention is a housing assembly (2) and further comprising: plural connecting webs; and the plural connecting webs (33) are spacedly arrayed about a circumference of the Cable bushing (7).

A further object of the present invention is a housing assembly (2) wherein, precisely one connecting web (33) is provided.

A further object of the present invention is a housing assembly (2) wherein, the housing securing part (23) is, in the preassembly state, rotated or pivoted relative to an assembled state of the housing securing part (23) on the first housing part (5).

A further object of the present invention is a housing assembly (2) wherein, the housing securing part (23) is, in the preassembly state, spaced apart from the cable bushing (7) along a feed direction (Z) for the cable (3) in comparison to an assembled state of the housing securing part (23) on the first housing-part (5) along a feed direction (Z) for the cable (3).

A further object of the present invention is a housing assembly (2) and further comprising: a second housing part (6); and the first housing part (5) and the second housing part (6) when connected to one another, each form circumferential portions ($U_1$, $U_2$) of the cable bushing (7); and wherein the housing securing part (23) encloses at least a portion of each of the first housing part (5) and the second housing part (6) in the region of the cable bushing (7) in order to fix the first and second housing parts (5, 6) to one another.

A further object of the present invention is a housing assembly (2) wherein, a housing assembly direction (G) for connecting the first housing part (5) to the second housing part (6); and a securing assembly direction (S) for assembling the housing securing part (23) on the first and the second housing parts (5, 6) are not the same.

A further object of the present invention is a housing assembly (2) wherein, the housing securing part (23) is displaceable along a feed direction (Z) into a final assembly position in which the housing securing part (23) encloses at least a portion of the first housing part (5) proximate the cable bushing (7); and wherein the housing securing part (23) and the first housing part (5) together form a linear guide.

A further object of the present invention is a housing assembly (2) wherein, the housing securing part (23) circumferentially encloses the first housing part (5), and the second housing part (6), in a region of the cable bushing (7).

A further object of the present invention is a housing assembly (2) and further comprising: a housing sealing element (15) that has a circumferentially closed profile and which defines a central opening (19); and the housing sealing element (15) provides a seal between the first housing part (5) and a second housing part (6); and wherein the housing sealing element (5) is formed at an angle so that a first portion (20) of the housing sealing element (15) and the central opening (19) defined by the housing sealing element (15) extend in a first plane ($E_1$); and a second portion (21) of the housing sealing element (15) and the central opening (19) defined by the housing sealing element (15) extend in a second plane ($E_2$).

A further object of the present invention is a plug connector (1) comprising: a housing assembly (2) having, a first housing part (5), that forms at least a circumferential portion of a cable bushing (7) through which a cable (3) can be introduced into an interior (8) defined by the housing assembly (2), and a cable sealing element (12), for the cable (3) in the cable bushing (7), and a housing securing part (23) which, at least in portions, encloses the first housing part (5) proximate the cable bushing (7), in a region of the cable sealing element (12), and a connecting web (33), that connects the first housing part (5) and the housing securing part (23) to one another in a pre-assembly state; and a contact element (4) which can be connected to the cable (3).

A further object of the present invention is a method for assembling a plug connector (1), comprising the steps: providing a housing assembly (2), the housing assembly (2) having a first housing part (5), that forms at least a circumferential portion of a cable bushing (7), and a housing securing part (23), and a connecting web (33) that connects the housing securing part (23) and the first housing part (5) to one another in a preassembly state; and providing a cable (3) and introducing the cable (3) through a cable sealing element (12) which is accommodated in the cable bushing (7); and connecting the housing securing part (23) on the first housing part (5) so that the first housing part (5) is enclosed at least in portions proximate the cable bushing (7) by the housing securing part (23); and breaking the connecting web (33) to separate the first housing part (5) from the housing securing part (23) prior to or during assembly of the plug connector (1).

A still further object of the present invention is a housing assembly (2) and further comprising: a housing assembly direction (G) for connecting the first housing part (5) to the second housing part (6); and a securing assembly direction (S) for assembling the housing securing part (23) on the first and the second housing parts (5, 6); and the housing assembly direction (G) and the securing assembly direction (S) run orthogonally to one another.

An even still further object of the present invention is a housing assembly (2) as wherein, the connecting web (33) is elastically deformable as a hinge to enable assembly of the housing securing part (23) on the first housing part (5).

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. A housing assembly (2) for a plug connector (1), comprising:

at least one first housing part (5) in order to form a cable bushing (7) through which a cable (3) can be introduced into an interior (8) of the housing assembly (2);

a cable sealing element (12), accommodated in the cable bushing (7), for the cable (3); and a housing securing part (23) which at least in portions encloses at least the first housing part (5) at least in a region of the cable bushing (7); and wherein at least the first housing part (5) and the housing securing part (23) are, in a preassembly state, connected in one piece to one another via at least one connecting web (33).

2. The housing assembly (2) as claimed in claim 1 and wherein the at least one connecting web (33) is formed as a predetermined breaking point in order to separate the at least one first housing part (5) and the housing securing part (23) prior to or during final assembly.

3. The housing assembly (2) as claimed in claim 1 and wherein the at least one connecting web (33) is formed to be elastically deformable at least in portions, in a manner of a film hinge, in order to enable assembly of the housing securing part (23) on the at least one first housing part (5).

4. The housing assembly (2) as claimed in claim 1 and wherein the at least one connecting web (33) is formed in the region of the cable bushing (7) of the at least one first housing part (5).

5. The housing assembly (2) as claimed in claim 1 and further comprising:

plural connecting webs (33) along a circumference of the cable bushing (7).

6. The housing assembly (2) as claimed in claim 1 and wherein precisely one connecting web (33) is provided.

7. The housing assembly (2) as claimed in claim 1 and wherein, in the preassembly state, the housing securing part (23) is in a rotated arrangement relative to its position when assembled on the at least one first housing part (5).

8. The housing assembly (2) as claimed in claim 1 and wherein, in the preassembly state, the housing securing part (23) is spaced apart from the cable bushing (7) along a feed direction Z for the cable (3) relative to the housing securing part (23) position when assembled on the at least one first housing part (5).

9. The housing assembly (2) as claimed in claim 1 and further comprising:

a second housing part (6) which can be connected mechanically to the at least one first housing part (5), wherein the first and second housing parts (5, 6), in a state connected to one another, form respective circumferential portions ($U_1$, $U_2$) of the cable bushing (7); and wherein the housing securing part (23) at least in portions encloses the at least one first housing part (5) and the second housing part (6) at least in the region of the cable bushing (7) in order to fix the first and second housing parts (5, 6) on one another.

10. The housing assembly (2) as claimed in claim 9 and wherein a housing assembly direction (G) for connecting the at least one first housing part (5) to the second housing part (6), and a securing assembly direction (S) for assembling the housing securing part (23) on the first and second housing parts (5, 6) differ from one another.

11. The housing assembly (2) as claimed in claim 9 and wherein the housing securing part (23) clutches or fully circumferentially encloses the first housing part (5) and the second housing part (6), in the region of the cable bushing (7).

12. The housing assembly (2) as claimed in claim 9 and further comprising:

a housing sealing element (15) which is formed to ensure a seal between the at least one first housing part (5) and at least one further housing part, wherein the housing sealing element (15) has a circumferentially closed profile and forms a central opening (19), and wherein the housing sealing element (15) is formed at an angle so that a first portion (20) of the housing sealing element (15) and the central opening (19) extends in a first plane ($E_1$) and a second portion (21) of the housing sealing element (15) and the central opening (19) extends in a second plane ($E_2$).

13. The housing assembly (2) as claimed in claim 1 and wherein the housing securing part (23) on the at least one first housing part (5) is displaceable along a feed direction (Z) for the cable (3) into a final assembly position in which the housing securing part (23) at least in portions encloses the at least one first housing part (5) at least in the region of the cable bushing (7), wherein the housing securing part (23) and the at least one first housing part (5) form a mutual linear guide.

14. A plug connector (1), comprising:

a housing assembly (2), the housing assembly (2) comprising at least one first housing part (5) in order to form a cable bushing (7) through which a cable (3) can be introduced into an interior (8) of the housing assembly (2), a cable sealing element (12), accommodated in the cable bushing (7), for the cable (3), and a housing securing part (23) which at least in portions encloses at least the first housing part (5) at least in a region of the cable bushing (7), and wherein at least the first housing part (5) and the housing securing part (23) are, in a preassembly state, connected in one piece to one another via at least one connecting web (33); and at least one contact element (4) which can be connected to the cable (3).

15. A method for assembling a plug connector (1), comprising the method steps:

providing a housing assembly (2) which has at least one first housing part (5) and a housing securing part (23) which, in a preassembly state, are connected in one piece to one another via at least one connecting web (33);

introducing a cable (3) through a cable sealing element (12) which is accommodated in a cable bushing (7) formed by at least the first housing part (5); and assembly of the housing securing part (23) on at least the first housing part (5) so that it is enclosed at least in portions at least in a region of the cable bushing (7) by the housing securing part (23), and wherein the at least one connecting web (33) is broken during or prior to assembly in order to separate the first housing part (5) and the housing securing part (23).

* * * * *